(12) United States Patent
Buch et al.

(10) Patent No.: US 6,421,194 B1
(45) Date of Patent: Jul. 16, 2002

(54) DISK DRIVE HEAD-SELECT VERIFICATION

(75) Inventors: Bruce Buch, Westboro; Brian Nugent, Sterling; Festus Adelabu, Worcester; Nick Horgan, Marlboro, all of MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/263,400

(22) Filed: Mar. 5, 1999

(51) Int. Cl.$^7$ ................................................. G11B 5/09
(52) U.S. Cl. ..................... 360/48; 360/49; 360/77.08; 360/78.14; 360/63; 360/53
(58) Field of Search ........................... 360/48, 49, 77.8, 360/78.14, 72.2, 31, 61, 63, 53; 714/701, 770, 769

(56) References Cited

U.S. PATENT DOCUMENTS 5,457,583 A * 10/1995 Kaneko ........................ 360/63
5,596,460 A * 1/1997 Greenberg et al. ....... 360/78.14
6,288,860 B1 * 9/2001 Buch ........................... 360/48

* cited by examiner

*Primary Examiner*—Alan T. Faber
(74) *Attorney, Agent, or Firm*—Fish & Richardson P.C.

(57) ABSTRACT

A method of storing data on a surface of a storage disk, the data being capable of verifying an identity of the surface, includes determining first check data from first alignment correction data associated with a first storage surface. The method also includes determining second check data from second alignment correction data associated with a second storage surface such that the second check data is different from the first check data if the first and second alignment correction data are identical. The method further includes writing the first and second check data to the first and second storage surfaces in association with the first and second alignment correction data, respectively.

15 Claims, 8 Drawing Sheets

SURFACE 8:
  MUNGE VECTOR = 011
  TRACK 104: MODIFIED CHECK DATA = 111 XOR 011 = 100
  TRACK 103: MODIFIED CHECK DATA = 110 XOR 011 = 101

DISK DRIVE HEAD-SELECT VERIFICATION

BACKGROUND

This invention relates to gang writing storage disk drives.

Disk drive systems store data magnetically, typically in multiple disks each having two storage surfaces. Millions of bytes of information are stored on these surfaces as binary 1's and 0's. In order to efficiently store and retrieve the bytes of information stored on these disks, disk drive controllers need to know locations on the disks where to write data to and read data from. Each location on the disk surfaces is identified by short segments of site information stored at various locations on the disk surface. Using the site information the disk drive can accurately store data to and retrieve data from desired locations on the disk surfaces.

Data are stored in multiple concentric circular tracks on one or more surfaces of the disks. In each track are several spoke areas separated by user data areas. Spoke data stored in spoke areas provide site/position information of associated user data stored in adjoining user data areas. Spoke data are written so that they are readable regardless of a radial position of the heads relative to the disk.

Storing site information for use by the disk drive controller to identify locations on the disk surfaces adds a significant amount of time and cost to the production of the disk drive. Typically, a servowriter is used to write the site information on the disks. The servowriter is a specialized piece of machinery that is expensive, so few servowriters are used to write site information to many disks. This creates a bottleneck in production, with disks waiting to be written with site information. Reducing the time needed by the servowriter to write the site information to each disk can reduce the cost of the disk drives.

SUMMARY

According to one aspect of the invention, a method of storing data on a surface of a storage disk, the data being capable of verifying an identity of the surface, includes determining first check data from first alignment correction data associated with a first storage surface. The method also includes determining second check data from second alignment correction data associated with a second storage surface such that the second check data is different from the first check data if the first and second alignment correction data are identical. The method further includes writing the first and second check data to the first and second storage surfaces in association with the first and second alignment correction data, respectively.

According to another aspect of the invention, a method of using a disk drive includes selecting one of two storage disk surfaces that have similar surface identification information stored on the respective surfaces. The surfaces further store check data in association with the surface identification information, the check data of the selected surface being modified check data, representative of original check data. The method further includes reading the modified check data and processing the modified check data, differently than the check data of the nonselected surface would be processed, to recover the original check data.

According to another aspect of the invention, a disk drive includes a plurality of storage disks each storage disk having two surfaces. At least two of the surfaces of the plurality of storage disks include site data stored on the two surfaces, the site data indicative of either of the two surfaces, alignment correction data associated with the site data, and check data associated with the alignment correction data. The check data of a first of the two surfaces has a first relationship with respect to the alignment correction data of the first surface, and the check data of a second of the two surfaces has a second relationship with respect to the alignment correction data of the second surface. The first and second check data are different for identical alignment correction data, Various aspects of the invention may provide one or more of the following advantages. Time and cost to write data to disk surfaces using a servowriter are reduced. Spoke data can be gangwritten to multiple disk surfaces and the gangwritten surfaces can be distinguished. The identity of a gangwritten surface can be verified within a predetermined certainty before writing to the surface. The likelihood of unintentional destruction of data due to a head-select failure is reduced.

DESCRIPTION OF THE DRAWINGS

The foregoing features and other aspects of the invention will be more fully understood from the description below in conjunction with the accompanying drawings, in which.

DESCRIPTION OF PREFERRED EMBODIMENTS

Figure 1:
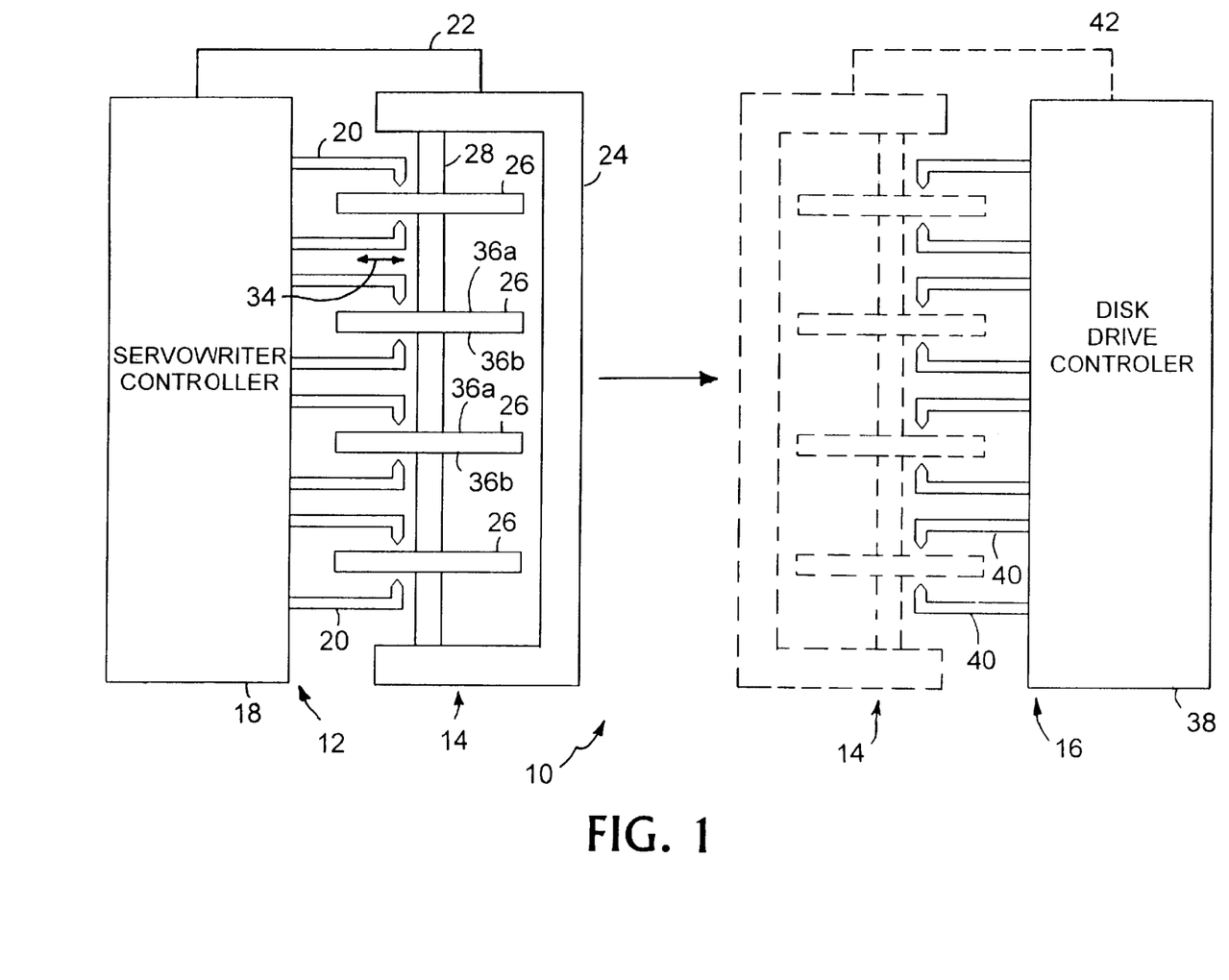
FIG. 1 is a diagram of a servowriter and a disk drive.

Referring to FIG. 1, a system 10 for reading and writing data to magnetic storage disks includes a servowriter 12, a disk stack 14, and a disk drive 16. The system 10 can reduce the time needed to write site information to the disks by gangwriting data to the disk surfaces. Gangwriting stores site information onto multiple disk surfaces simultaneously. For example, gangwriting to two disk surfaces essentially halves the time to store the site information. Although the operation of the system 10 is described in more detail below, suffice it to say here that the system 10 can gangwrite site information to the disks while reducing the likelihood of potential misidentification of the gangwritten surfaces.

Disk stack 14 includes a disk motor 24 coupled to multiple disks 26 by a central arm 28. Disks 26 each have a central opening 30 for snugly receiving central arm 28. Disk motor 24 can rotate central arm 28 in order to rotate disks 26 in response to signals received from servowriter 12.

Servowriter 12 includes a servowriter controller 18, coupled to disk motor 24 by a conductor 22, and multiple heads 20. Heads 20 are configured to magnetically store information on concentric tracks on surfaces 36 of the disks. Servowriter controller 18 sends signals through conductor 22 to disk motor 24 to control rotation of the disks 26. Servowriter controller 18 positions heads 20, as indicated by arrow 34, so that heads 20 are positioned to read from or write to desired tracks on top surfaces 36a and bottom surfaces 36b of disks 26. Servowriter controller 18 actuates heads 20 in order to magnetically store binary bytes of information on the tracks, e.g., by gangwriting surfaces 36 by concurrently writing to multiple (e.g., two) surfaces 36.

Disk drive 16 can be coupled to disk stack 14 through a line 42 and includes a disk drive controller 38 and multiple read/write heads 40. Read/write heads 40 are configured to magnetically store information on the tracks and read magnetically-stored data from the tracks. Disk drive controller 38 controls disk motor 24 to cause central arm 28, and therefore disks 26, to spin. Disk drive controller 38 positions read/write heads 40 above selected tracks and actuates read/write disks 40 in order to write information to, or read information from, the tracks. Disk drive controller 38 is typically less expensive than servowriter 12 but typically takes more time to write data to the tracks than servowriter 12.

Servowriter 12 and disk drive 16 write portions of spoke data to spoke areas of disks 26. The spoke data include servodata written by servowriter 12 and burst correction values (BCVs) written by disk drive 16.

Figure 2:
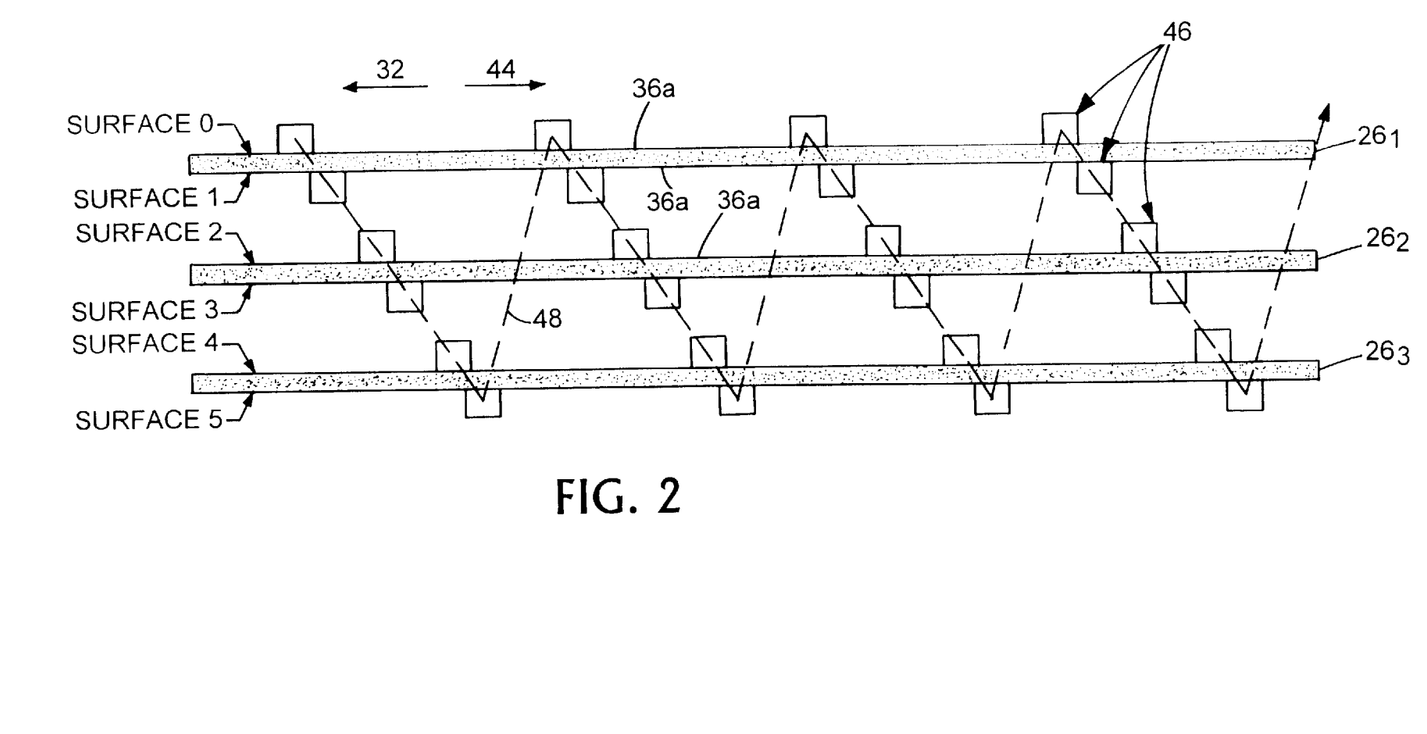
FIG. 2 is a cut-away view of three disks for use with the disk drive shown in FIG. 1.

Referring to FIG. 2, servowriter 12 can write servodata to a single surface 36 at a time. As shown, spoke data are sequentially written to top and bottom surfaces 36a and 36b of three disks $26_1$–$26_3$. For clarity, three disks $26_1$–$26_3$ have been cut away along a radial line and laid out linearly (i.e., they have been "linearized"). As disks $26_1$–$26_3$ are rotated in the direction of arrow 32, heads 20 move relative to disks 26 as indicated by arrow 44. Boxes 46 represent locations of the selected head 20 while it is writing on an associated surface 36. The spoke areas are spaced apart along the tracks 35, so to save time, site information is written to surface 36a of disk $26_1$, then to surface 36a of disk $26_2$, and so forth. Thus, a saw tooth pattern of writing site information, as indicated by arrow 48, is formed.

Figure 3:
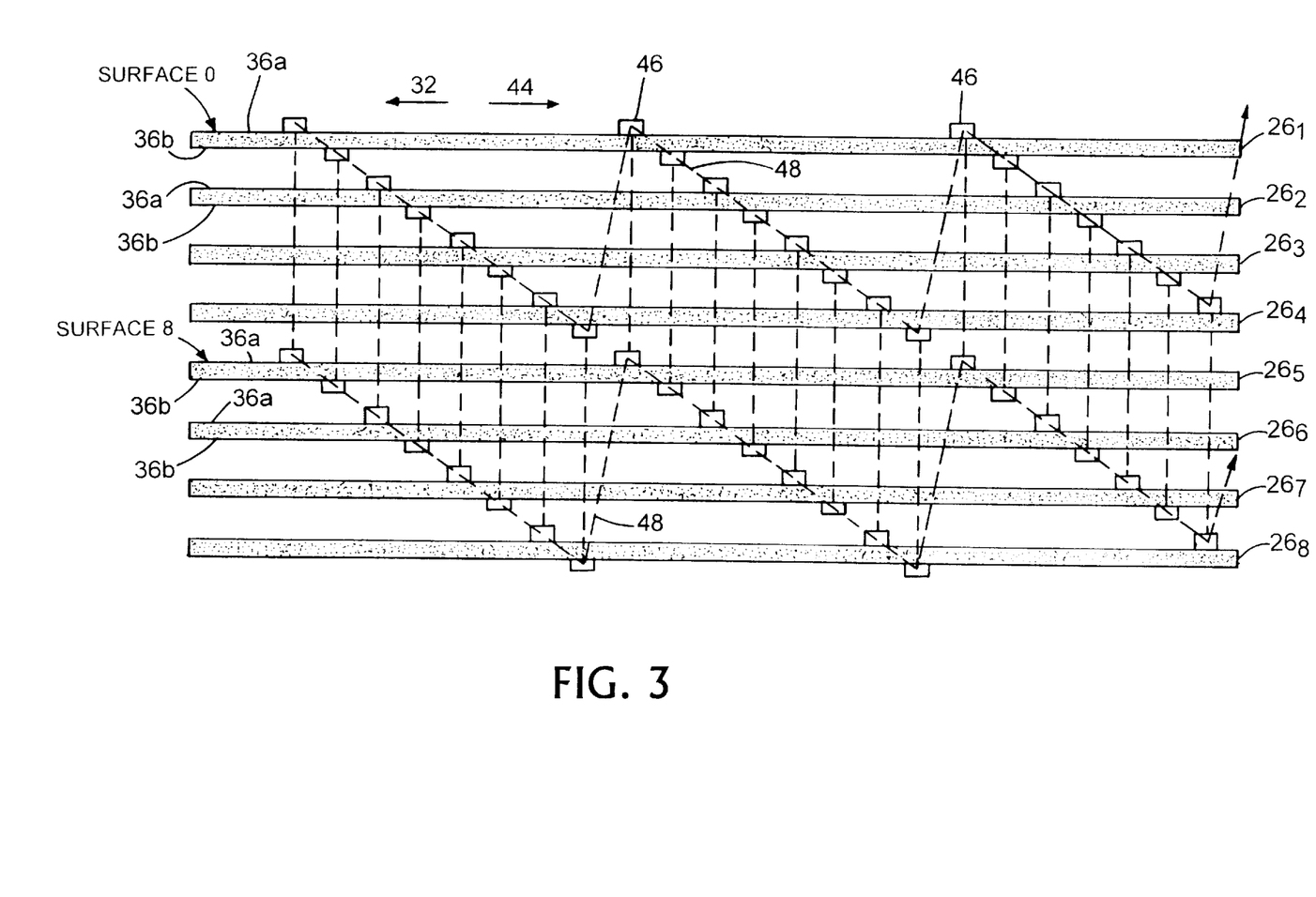
FIG. 3 is a cut-away view of eight disks.

Servowriter 12 can also gangwrite servodata to disks 26. FIG. 3 illustrates eight disks $26_1$–$26_8$, in cut-away fashion similar to FIG. 2, being gangwritten. As indicated by boxes 46, servowriter 12 concurrently writes to top surfaces 36a of disks $26_1$ and $25_5$, to bottom surfaces 36b of disks $26_1$ and $26_5$ and to top surfaces 36a of disks $26_2$ and $26_6$ and so forth. Gangwriting to surfaces 36 reduces the time required by servowriter 12 to write the servodata to the disks 26. A consequence of gangwriting servodata to disks 26 is that the same servodata are written to different surfaces 36. The servodata include a surface designation, and therefore multiple different surfaces 36 will have identical surface designations. This ambiguous identification creates a potential for misidentification of surfaces during subsequent write or read operations.

Therefore, to minimize the potential for misidentification servowriter 12 gangwrites servodata to reduce the time required to write the servodata for each disk 26, but disk drive 16 writes the BCV data in a manner such that the spoke areas are uniquely identified.

Figure 4:
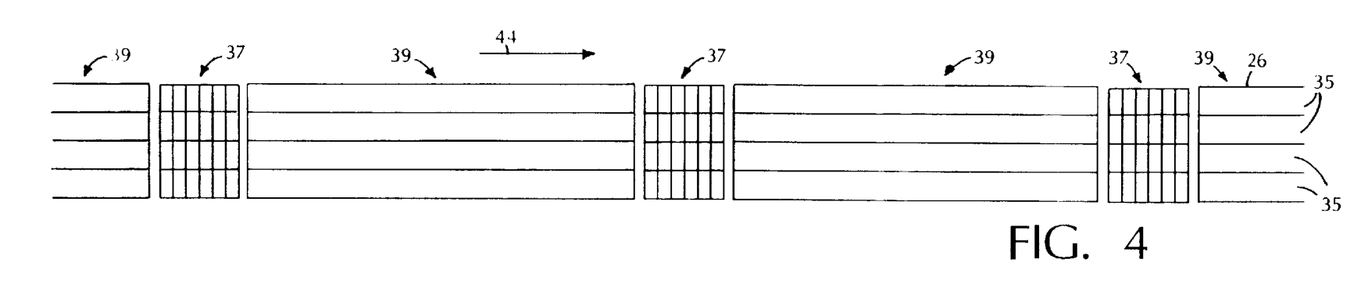
FIG. 4 a top view of a portion of four tracks of one of the disks shown in FIG. 2.

FIG. 4 shows spoke areas 37 and user data areas 39 for several tracks 35 of one of the linearized disks 26 of FIG. 2 or FIG. 3. The writing illustrated in FIG. 2 and FIG. 3 is repeated for other tracks 35 on the surfaces 36, yielding spoke areas 37 of differing tracks 35 that are adjacent to each other. Spoke areas 37 are associated with respective user data areas 39 disposed next to the spoke areas 37 in the direction of arrow 44.

Figure 5:
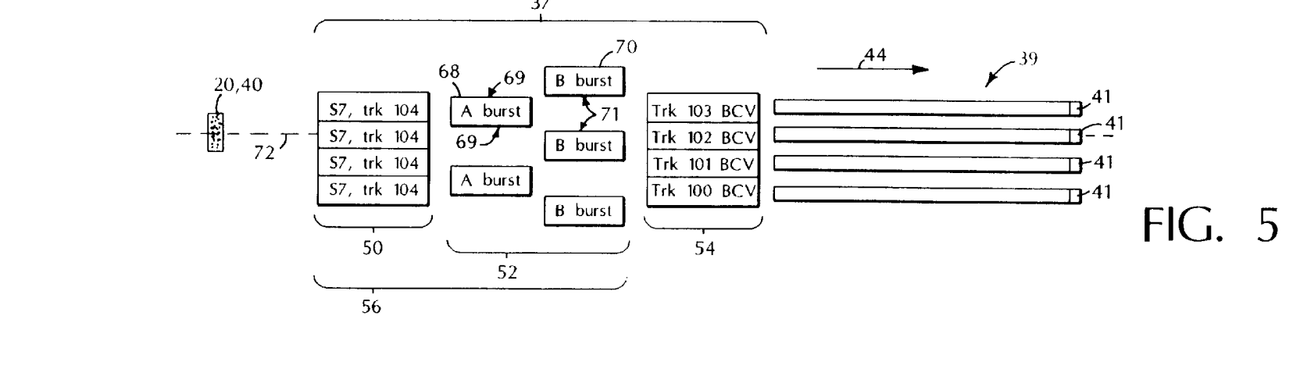
FIG. 5 is an enlarged view of portions of the tracks shown in FIG. 4.

Referring now to FIG. 5, each spoke area 37 includes servodata 56 and burst correction values (BCVs) 54. Servodata 56 include site information 50 and burst data 52. Site information 50 indicates the track number, spoke number, and surface number, which is ambiguous for gangwritten surfaces 36, for the particular spoke area. Burst data 52 assist with alignment of heads 40 with respect to tracks 35. BCVs 54 include alignment data and check data. The alignment data (i.e., alignment correction information) indicate the alignment of burst data 52 relative to the track, and the check data are a representation of the alignment data in order to help detect errors in demodulating the alignment data. By writing BCVs 54 with disk drive 16, instead of servowriter 12, the amount of time needed for each disk stack 14 in servowriter 12 is reduced. Additionally, multiple disk drives 16 can write BCVs 54 to multiple disk stacks 14 at the same time, reducing the time needed to write BCVs 54 to multiple disk stacks 14. Writing BCVs 54 with disk drive 16 helps to reduce the cost needed to write data to spoke areas 37.

Burst data 52 include an A burst portion 68 and a B burst portion 70. These burst portions 68 and 70 are substantially similar, substantially uniform patterns of magnetic flux change. Burst portions 68 and 70 have edges 69 and 71 that border, or are equally offset relative to, a center line 72 of a corresponding track 35. When a head 40 is subsequently passed over burst portions 68 and 70 along a track 35, head 40 senses amplitudes of these burst portions 68 and 70. A difference in the sensed amplitudes indicates to what extent, if at all, head 40 is misaligned with respect to the burst portions 68 and 70. This difference can be used to adjust the position of head 40 to align with burst portions 68 and 70 such that head 40 would sense the burst portions equally.

Figure 6:
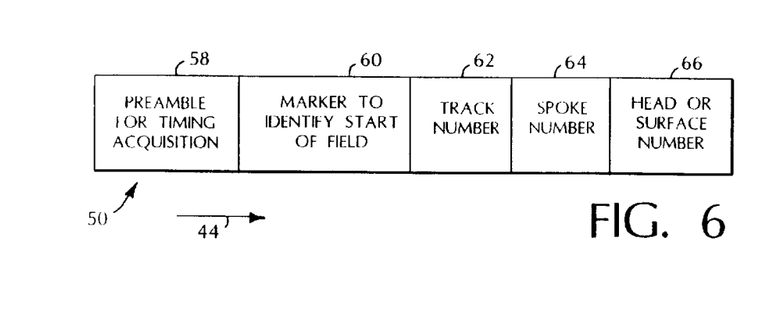
FIG. 6 is a block diagram of a site information block shown in FIG. 5.

Referring now to FIG. 6, site information 50 includes preamble data 58, a start marker 60, a track number 62, a spoke number 64, and a head or surface number 66. As head 20 moves along disk 26 in the direction indicated by arrow 44, head 20 writes preamble data 58 for later use by disk drive 16 to assist with the timing for reading subsequent (i.e., in direction 44) data. Head 20 writes marker 60 to identify the start of the data indicating the track number 62, spoke number 64, and head or surface number 66. The number 66 can be referred to as either a head or a surface number because of the 1-to-1 relationship between heads 20, 40 and selectable surfaces 36.

Figure 7:
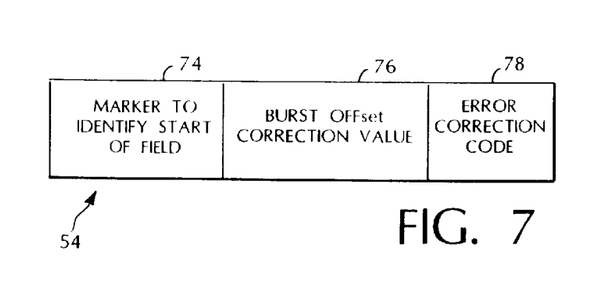
FIG. 7 is a block diagram of a correction data block shown in FIG. 5.

FIG. 7 shows that BCVs 54 include marker data 74, alignment data (i.e., burst offset information) 76, and check data (i.e., an error correction code) 78. Marker data 74 indicates the beginning of alignment correction information 76 and check data 78. Alignment correction information 76 indicates to what extent, if any, the burst portions 68 and 70 are misaligned with respect to center line 72 of track 35. Alignment data 76 can be used to adjust the position of head 40 relative to burst portions 68 and 70 to align head 40 on center line 72.

Figure 8:
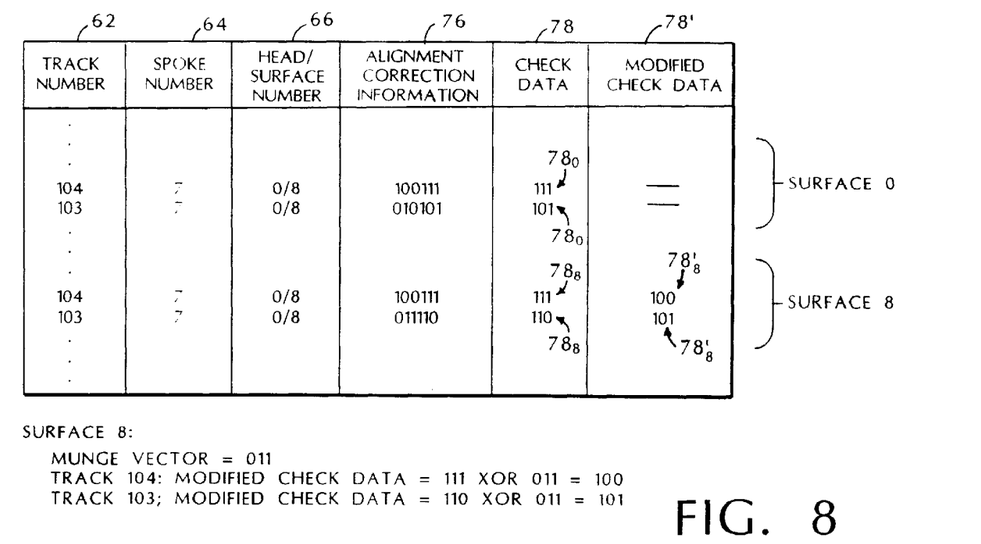
FIG. 8 is a table of exemplary data stored in site information blocks and correction data blocks.

Referring to FIGS. 3 and 8, track number 62, spoke number 64, head/surface number 66, and alignment correction data 76 for similar tracks 35 and spokes 37 on gangwritten surfaces 36 are shown. Here, data are shown for surface 36a of disk $26_1$, corresponding to surface number 0, and surface 36a of disk $26_5$, corresponding to surface number 8. Surfaces 0 and 8 were gangwritten, and therefore the head/surface numbers 66 ambiguously indicate surface "0/8". For simplicity, check data 78 are the last three digits of alignment correction data 76. Check data $78_0$ of surface number 0 are 111. The remainder of FIG. 8 is described below with reference to the operation of system 10.

Figure 9:
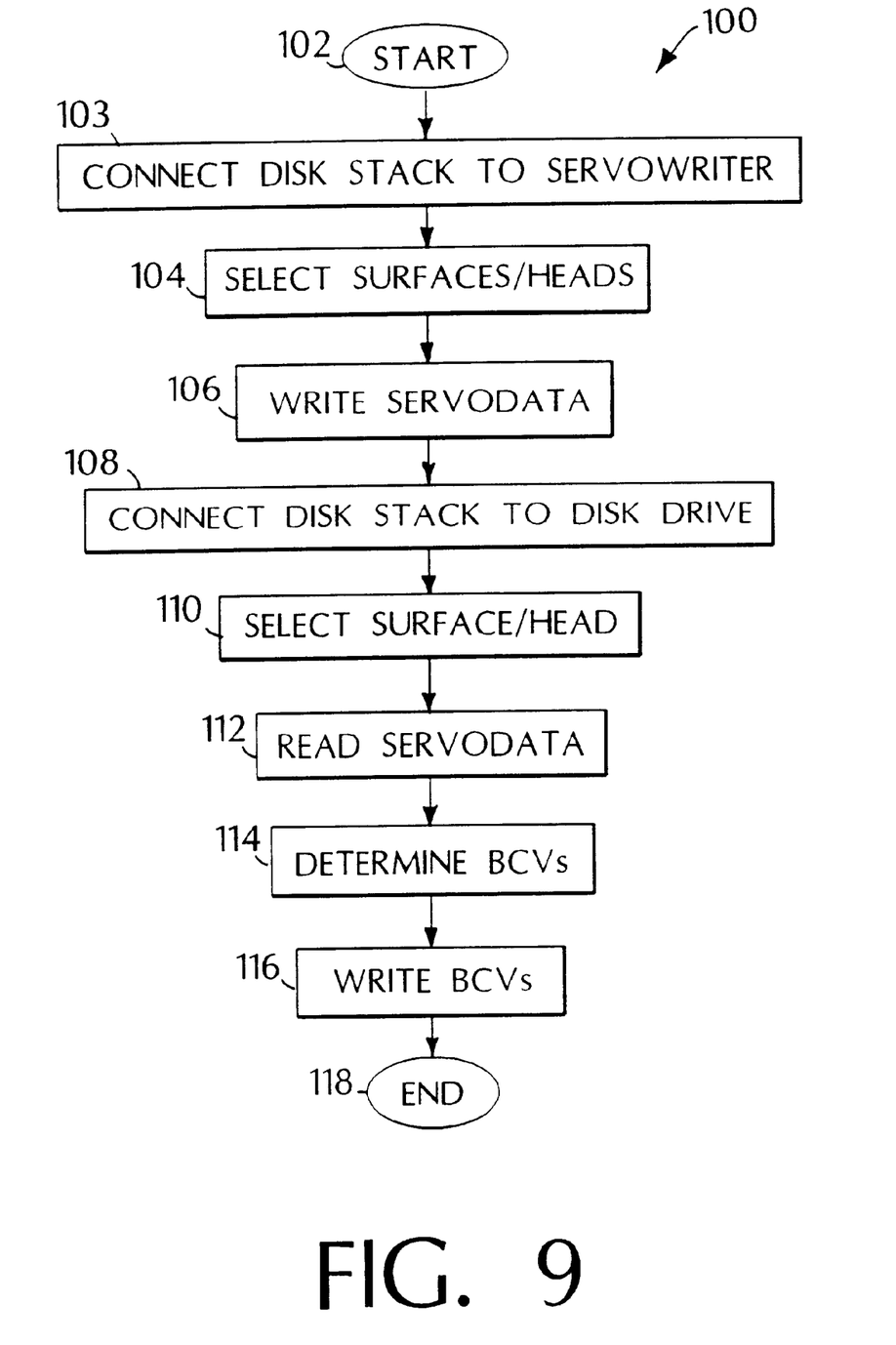
FIG. 9 is a block diagram of a method of determining and writing correction data.

Referring to FIG. 9, a process 98 of determining and writing spoke data starts 102 with the disk stack 14 connected 103 to servowriter 12. Servowriter controller 18 selects 104 heads 20, and therefore corresponding surfaces 36 of disks 26. Servowriter controller 18 signals the disk motor 24 to spin the disks 26 and positions the selected heads 20 to write to desired tracks 35. Servowriter controller 18 supplies servodata to the selected heads 20 and actuates the selected heads 20 to write 106 the servodata to the selected surfaces 36.

When the servodata 56 has been written to all desired spoke areas 37 of all desired surfaces 36, disk stack 14 is connected 108 to disk drive 16. Disk drive 16 selects 110 surfaces 36, reads 112 servodata from surfaces 36, determines 114 BCVs, and writes 116 BCVs to spoke areas 37. Disk drive controller 38 determines 114 BCVs 54 such that BCVs 54 distinguish ambiguously-identified gangwritten surfaces 36 from each other.

Disk drive controller 38 determines 114 the alignment data 76 as a function of the offset of A burst portion 68 and B burst portion 70 relative to center line 72. Disk drive controller 38 determines the offset of burst portions 68 and 70 relative to center line 72 by sensing the burst portions 68 and 70 with a head 40 aligned with center line 72. A difference in the sensed magnitudes indicates the offset of burst portions 68 and 70. If the offset is zero, then burst portions 68 and 70 are aligned along center line 72 and disk drive controller 38 produces binary alignment data 76 indicating that no correction is necessary. If the offset is non-zero, then disk drive controller 38 computes binary alignment data 76 indicative of the offset. These data 76 will indicate to a disk drive controller 38 reading the data 76 to position head 40 differently than indicated by the difference of the sensed amplitudes of burst portions 68 and 70 in order to center head 40 on center line 72. The alignment data 76 helps disk drive 16 compensate for the offset of burst portions 68 and 70.

Disk drive controller 38 also computes check data 78 for use in detecting or correcting errors in the demodulation of alignment correction information 76. Check data 78 are a representation of alignment data 76, requiring fewer bits than alignment data 76. Check data 78 can be, e.g., a hamming code based on alignment data 76.

Disk drive controller 38 modifies check data 78 of gangwritten surfaces 36 to distinguish between the surfaces 36. For the case of two gangwritten surfaces 36, check data 78 of only one of the surfaces need to be modified. Disk drive controller 38 modifies original check data 78 of one of the gangwritten surfaces 36 by applying a logical function to original check data 78, yielding modified check data 78'. For example, disk drive controller 38 can retrieve a binary value, called a "munge vector", for a selected surface 36 from a look-up table, stored in memory in controller 38, having munge vectors associated with surface numbers. Controller 38 exclusive-ORs check data 78 with the munge vector associated with the selected surface 36 to yield modified check data 78'. The logical function for modifying original check data 78 can be associated with multiple surfaces 36 (e.g., half of the gangwritten surfaces 36) but is associated with only one of the two gangwritten surfaces 36. Alternatively, the two gangwritten surfaces 36 can have different logical functions (e.g., different munge vectors) associated with them. Original check data 78 can be recovered from modified check data 78', e.g., by applying the reverse of the logical function used to modify original check data 78. Continuing the example, modified check data 78' can be exclusive-ORed on a bit by bit basis with the munge vector to recover original check data 78.

Referring again to FIG. 8, a munge vector for surface 8 is (011). Exclusive-ORing (XORing) the munge vector with original check data $78_8$ of surface number 8 yields modified check data $78_8'$, e.g., (100) for track number 104. Thus, modified check data $78_8'$ of track number 104 are different than check data $78_0$ of track number 104 even though the alignment information 76 of each is identical.

The munge vector and other data shown in FIG. 8 are exemplary only, and not limiting. Other munge vector values may be used.

Returning to FIG. 9, disk drive controller 38 writes 116 BCVs 54 to surfaces 36. BCVs 54 include marker 74, alignment data 76, check data 78 for surfaces for which modified check data 78' was not computed, and modified check data 78' for surfaces for which such data was computed. After writing 116 BCVs 54 to surfaces 36, process 98 ends 118.

Figure 10:
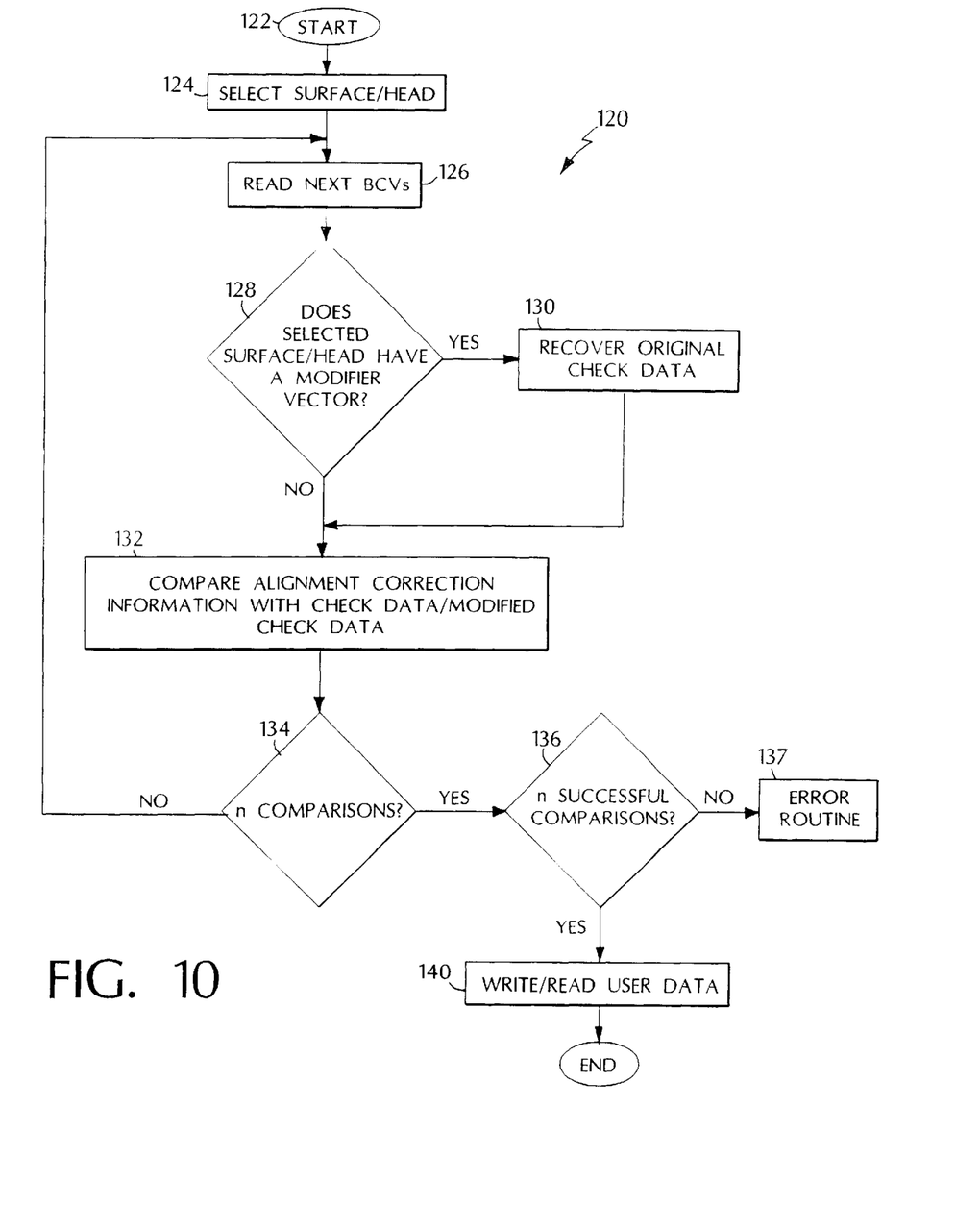
FIG. 10 is a block diagram of a method of verifying a surface of a disk using correction data.

Referring to FIG. 10, a process 120 of verifying the identity of a surface 36 starts 122 with disk drive controller 38 selecting 124 a read/write head 40 corresponding to a surface 36, e.g., surface number 8 shown in FIG. 3. Disk drive controller 38 positions the selected head 40 over a selected track 35 and actuates disk motor 24 to spin disks 26.

When disks 26 are spinning, disk drive controller 38 uses the selected head 40 to read 126 spoke 37, including servodata 56 and BCVs 54. Disk drive controller 38 determines 128 whether the selected surface 36 should contain modified check data 78'. For example, controller 38 accesses the look-up table having munge vectors corresponding to head numbers. If the selected head 40 has an associated munge vector, the check data read by the selected head 40 (i.e., the read check data) are recovered 130 by exclusive-ORing with the retrieved munge vector to reverse the modification process associated with the selected surface 36. Here, modified check data $78_8'$ (100) (FIG. 8) of track 104 are read and XORed with the munge vector, (011), of surface number 8 to recover original check data $78_8$ of (111).

The read check data from different gangwritten surface 36 are processed differently. If the read check data should be original check data 78, then the data are compared 132 as described below. If the read check data should be modified check data 78', then the data are unmodified 130, then compared 132. If both surfaces 36 should contain modified check data 78', then the data from the two surfaces are unmodified 130 differently, e.g., by XORing the data with different munge vectors.

After the original check data 78 are recovered 130, or if the read check data should be original check data 78, original check data 78 are compared 132 with alignment data 76 read by the selected head 40. To do this, either original check data 78 are transformed into the format of alignment data 76, or vice versa.

If the proper head 40 was actuated to read from the desired disk 26, then original check data 78 will have been properly recovered 130, if necessary, and the comparison 132 of original check data 78 and alignment data 76 will be successful.

If the proper head 40 was not actuated, then the read data will not have been manipulated to recover original check data 78 when it should have been, or manipulated to recover original check data 78 when it should not have been, and the comparison 132 will fail. For example, if head 40 corresponding to surface number 0 was actuated when surface number 8 was selected, then the read check data will be (111). These data will be recovered 130, by XORing with the munge vector (011), when they should not be, yielding data (100) that are improperly believed to be original check data 78. These data will not correspond with alignment data 76 read from surface number 0. Alternatively, if surface number 0 is selected, and head 40 corresponding to surface number 8 is actuated, then modified check data 78' (100) will be assumed to be original check data 78. The comparison 132 with alignment data 76 read from surface number 8 will therefore fail.

It is possible for the comparison 132 to pass even if the selected head 40 is not actuated (i.e., there is a head-select error). For example, disk drive controller 38 may improperly convert alignment data 76 into original check data 78, or vice versa, or may improperly modify or recover check data.

To guard against falsely concluding that a head-select error has not occurred, disk drive controller 38 verifies several BCVs 54 before writing to user data areas 39. Disk drive controller 38 returns 134 to read 126 the next BCVs 54 if n comparisons have not been performed. Once n comparisons 132 have been performed, disk drive controller 38 determines 136 whether the n comparisons 132 have been successful. If not, then process 120 performs an error routine 137. If so, then disk drive controller 38 writes 138 user data to user data areas 39. After appropriate writing 138, process 120 ends 140.

The same process 120 may be used before reading from user data areas 39. When reading, however, using process 120 is not as important as when writing because reading does not present the risk of erroneously destroying data. Also, separate heads 40 are often used for writing and for reading, and the read heads 40 are often not positioned for reading BCVs 54, preventing use of process 120 for reading user data areas 39.

Figure 11:
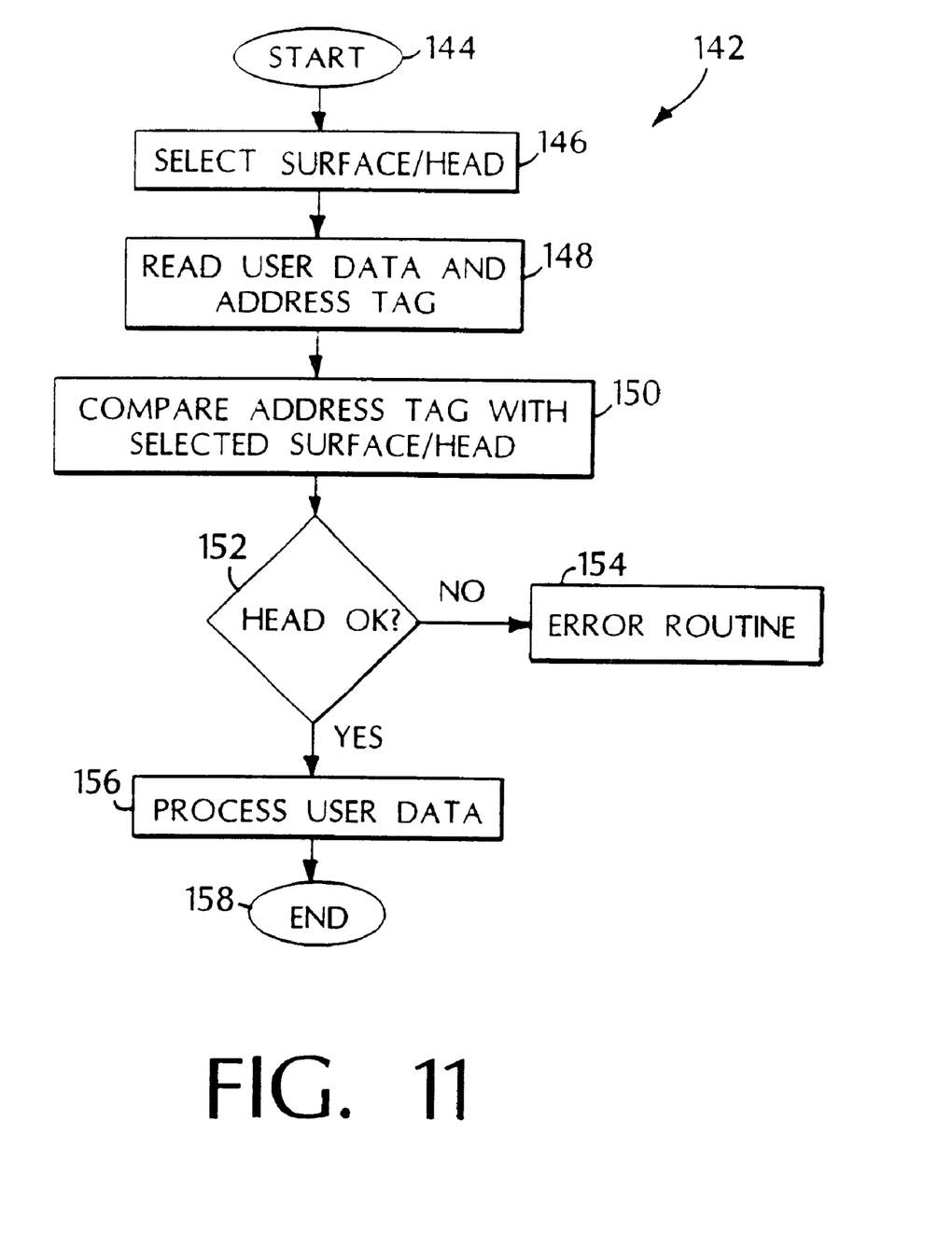
FIG. 11 is a block diagram of a method of verifying a surface of a disk without using correction data.

Referring to FIG. 11, a process 142 of verifying the identity of a surface 36 using user data starts 144 with disk drive controller 38 selecting 146 a head 40. Disk drive controller 38 positions the selected head 40 over a selected track 35 and actuates disk motor 24 to spin disks 26.

When disks 26 are spinning, disk drive controller 38 uses the selected head 40 to read 148 user data from user data area 39. As shown in FIG. 5, user data areas 39 contain address tag areas 41 that store address tag data. These data indicate the respective locations of the address tag areas 41, including the surface 36 on which the address tag data are stored.

Process 142 continues with disk drive controller 38 comparing 150 the surface 36 indicated by the address tag data with the selected surface number. Disk drive controller 38 determines 152 whether the indicated surface 36 and the selected surface 36 match. If not, then process 142 performs an error routine 154. If so, then process 142 processes 156 the user data, such as by transferring the user data to a bus, or performing a logical operation, e.g., an exclusive-OR, on the user data and then transferring the results to the bus. After processing 156 the user data, process 142 ends 158.

Other embodiments are within the scope of the claims. For example, in process 120 shown in FIG. 10, instead of requiring each of n comparisons to be successful before writing user data, other criteria can be used. One possible alternative criterium is to make m comparisons and require n, which is less than m, comparisons to be successful before writing the user data. Also, processes can be used to modify check data 78 other than exclusive-ORing with a munge vector.

Servowriter 12 can gangwrite to more than two surfaces 36. In this came, the logical function for modifying original check data is unique among all the gangwritten surfaces 36. For example, if four surfaces 36 are gangwritten, then one surface 36 can have no munge vector associated with it and the other three surfaces can have each have an associated munge vector, different from the other two munge vectors. Alternatively, all four surfaces 36 could have associated munge vectors, with each munge vector being different from the other three.

What is claimed is:

1. A method of storing data on a surface of a storage disk, the data being capable of verifying an identity of the surface, the method comprising:

determining first check data from first alignment correction data associated with a first storage surface;

determining second check data from second alignment correction data associated with a second storage surface such that the second check data is different from the first check data if the first and second alignment correction data are identical; and writing the first and second check data to the first and second storage surfaces in association with the first and second alignment correction data, respectively.

2. The method of claim 1 wherein writing the first check data comprises associating the first check data with first surface data indicative of the first and second surfaces and wherein writing the second check data comprises associating the second check data with second surface data indicative of the first and second surfaces.

3. The method of claim 1 wherein writing the first check data comprises writing the first check data to a first storage disk and writing the second check data comprises writing the second check data to a second storage disk, different from the first storage disk.

4. The method of claim 1 wherein the first check data is determined by exclusive-ORing a representation of the first alignment correction data with a first predetermined value.

5. The method of claim 4 wherein the second check data is determined by exclusive-ORing a representation of the second alignment correction data with a second predetermined value, different from the first predetermined value.

6. The method of claim 1 further comprising:

writing site data to substantially similar locations of the first and second storage disk surfaces; and determining the first and second alignment correction data based on the location of the site data with respect to tracks of the respective surfaces.

7. A method of using a disk drive, the method comprising:

selecting one of two storage disk surfaces that have similar surface identification information stored on the respective surfaces, the surfaces further storing check data in association with the surface identification information, the check data of the selected surface being modified check data, representative of original check data;

reading the modified check data; and processing the modified check data, differently than the check data of the nonselected surface would be processed, to recover the original check data.

8. The method of claim 7 wherein the processing of the modified check data comprises exclusive-ORing the check data with a predetermined binary value.

9. The method of claim 7 further comprising:

reading alignment correction information, associated with the site information, from the selected surface;

comparing a representation of the alignment correction information with the original check data, recovered from the modified check data.

10. The method of claim 9 further comprising:

providing an indication of whether the representation of the alignment correction information and the original, recovered check data have a predetermined relationship;

repeating the previously-mentioned actions for other site information and modified check data stored at other locations of the selected surface; and writing data to data entry areas of the selected surface associated with the site information and modified check data if a predetermined quantity of comparisons of the representation of the alignment correction information and the associated modified check data meet at least one predetermined criterium.

11. The method of claim 10 wherein the writing of data to the data entry areas occurs if a plurality of n consecutive comparisons are successful.

12. A disk drive comprising:

a plurality of storage disks each storage disk having two surfaces;

at least two of the surfaces of the plurality of storage disks including:

site data stored on the two surfaces, the site data indicative of either of the two surfaces;

alignment correction data associated with the site data; and check data associated with the alignment correction data with the check data of a first of the two surfaces having a first relationship with respect to the alignment correction data of the first surface, and the check data of a second of the two surfaces having a second relationship with respect to the alignment correction data of the second surface; and wherein the first and second check data are different for identical alignment correction data.

13. The disk drive of claim 12 wherein the first relationship comprises a first logical function and the second relationship comprises the first logical function and a second logical function operating on results of the first logical function.

14. The disk drive of claim 12 wherein the second relationship comprises exclusive-ORing the results of the first logical relationship with a predetermined value.

15. The disk drive of claim 12 wherein the first relationship comprises exclusive-ORing a representation of the alignment correction data of the first surface with a first value and the second relationship comprises exclusive-ORing a representation of the alignment correction data of the second surface with a second value, different from the first value.

* * * * *